United States Patent [19]

Enikolopov et al.

[11] 4,228,271
[45] Oct. 14, 1980

[54] PROCESS FOR PREPARING EPOXY RESIN

[76] Inventors: Nikolai S. Enikolopov, Kutuzovsky prospekt, 26, kv. 245; Anatoly I. Nepomnyaschy, ulitsa Scherbakovskaya, 5, kv. 52, both of Moscow; Viktor A. Pekarsky, ulitsa Kirova, kvartal 116, 24, kv. 30, Ljubertsy Moskovskoi oblasti; Tatyana A. Pekarskaya, Bratskaya ulitsa, 8, kv. 60, Moscow; Mikhail G. Brusilovsky, Krymsky val, 8, kv. 56, Moscow; Svetlana A. Gavrilina, Frunzenskaya naberezhnaya, 26, kv. 5, Moscow; Naum D. Lerman, ulitsa Volgogradskaya, 43a, kv. 40, Yaroslavl; Oleg K. Maimur, Zhivopisnaya ulitsa, 17, korpus 2, kv. 188, Moscow; Arkady L. Iljushin, ulitsa 9 Pyatiletki, 9, kv. 79, Kotovsk Tambovskoi oblasti; Mikhail A. Markevich, prospekt Vernadskogo, 89, korpus 4, kv. 12, Moscow; Susanna M. Karpacheva, ulitsa Marshala Novikova, 2, kv. 88, Moscow; Lidia P. Khorkhorina, 2 Peschany pereulok, 20, korpus 1, kv. 54, Moscow; Valeryan M. Muratov, Ostakhovsky pereulok, 1/2, kv. 118, Moscow; Semen F. Sholk, Zvenigorodskoe shosse, 3a, kv. 223, Moscow, all of U.S.S.R.

[21] Appl. No.: 19,446

[22] Filed: Mar. 12, 1979

[51] Int. Cl.$^2$ .................................... C08G 59/06
[52] U.S. Cl. ........................ 528/95; 260/348.15; 528/92
[58] Field of Search .............. 260/348.15; 528/92, 528/95

[56] References Cited

U.S. PATENT DOCUMENTS

| | | | |
|---|---|---|---|
| 2,896,551 | 5/1961 | Griffin et al. | 260/47 |
| 2,896,552 | 5/1961 | Landua et al. | 260/47 |
| 2,943,095 | 6/1960 | Farnham et al. | 260/348.6 |
| 2,943,096 | 6/1960 | Reinking | 260/348.6 |
| 3,069,434 | 12/1962 | Spence et al. | 260/348.6 |
| 3,309,384 | 3/1967 | Shimp et al. | 260/348.6 |

*Primary Examiner*—Earl A. Nielsen
*Attorney, Agent, or Firm*—J. Harold Nissen

[57] ABSTRACT

A process for preparing epoxy resin comprises a step of allowing a mixture of epichlorohydrin, 2,2-bis(p-hydroxyphenyl)propane, and a solvent in the presence of an alkali used in an amount of from 0.4 to 5% by weight of the epichlorohydrin to stay at a temperature of from 45° to 70° C. to obtain a homogeneous mass. Subsequently an alkali used in an amount of from 45 to 50% by weight of the epichlorohydrin is added to the resultant mass, and polycondensation is conducted at a temperature of 70° to 90° C. under stirring to obtain the end product.

6 Claims, No Drawings

PROCESS FOR PREPARING EPOXY RESIN

The invention relates to a process for preparing synthetic resins, and more specifically, to a process for preparing epoxy resin.

These resins exhibiting a number of valuable properties such as high adhesion, chemical resistance, stability to high temperatures, flexibility, hardness and high insulating properties are widely used in moulded, adhesive systems, as film-forming substances in paint, powder and other materials.

Known in the art is a process preparing epoxy resin, comprising mixing monomers epichlorohydrin and 2,2-bis(p-hydroxyphenyl)propane (Bisphenol A) in the presence of a solvent, such as a ketone. Then the resultant mixture and an aqueous solution of sodium hydroxide are charged into a reactor. The process is conducted under a high pressure (up to 7 atm.) and at a high temperature (up to 180° C.) on the continuous basis (cf. U.S. Pat. No. 2,986,552). One of the main disadvantages of this process resides in hydrolysis of epichlorohydrin caused by the high temperature and presence of a great quantity of the aqueous solution of an alkali in the reaction zone. This, in turn, results in an increased consumption of expensive epichlorohydrin and contamination of the epoxy resin with by-products.

Another disadvantage of this process resides in that the organic mixture charged into the reactor is non-homogeneous and contains solids thus complicating service of the equipment. The use of increased amounts of the solvent to eliminate the solids results in a lowered process speed and incomplete utilization of the reaction zone. A further disadvantage resides in the need to employ high-pressure equipment and results in increased power requirements.

The conduct of this process using a cascade of reactors does not eliminate the above-mentioned disadvantages and results in increased capital investments in the equipment.

The main object of the invention is to simplify the production process, improve economic factors and reduce losses of the expensive starting material.

This object is accomplished in a process for preparing epoxy resin, comprising, according to the invention, allowing a mixture of epichlorohydrin, 2,2-bis(p-hydroxyphenyl) propane and a solvent, in the presence of an alkali in an amount varying from 0.5 to 4% by weight of the epichlorohydrin, to stay at a temperature varying from 45° to 70° C. to obtain a homogeneous mass, with subsequent adding to this mass of an alkali in an amount varying from 45 to 50% by weight of the epichlorohydrin and conducting polycondensation under stirring at a temperature varying from 70° to 90° C. to obtain the end product.

The above-mentioned homogeneous mass is a product of a primary addition of 2,2-bis(p-hydroxyphenyl) propane to epichlorohydrin, which is referred to as chlorohydrin ether. Unreacted 2,2-bis(p-hydroxyphenyl) propane present in the homogeneous mass is well soluble therein and does not precipitate in the form of a solid mass even upon cooling. Moreover, this amount of 2,2-bis(p-hydroxyphenyl) propane is sufficient for any hydrolysis of epichlorohydrin to be substantially suppressed in spite of the presence of an alkali. A small quantity of an alkali is completely consumed in an acid-base equilibrium of 2,2bis(p-hydroxyphenyl) propane-alkali with the formation of nucleophiles added to the epoxy ring. The addition of the remainder of an alkali to the homogeneous mass results in the alkali reacting not with the starting monomer epichlorhydrin but with its bound form chlorohydrin ether which is subject to hydrolysis to a much smaller extent.

Owing to the preparation of a highly concentrated homogeneous reaction mass the polycondensation process occurs at lower temperatures thus making the process more enconomical.

For diminishing the consumption of epichlorohydrin and the solvent and for raising the efficiency of the equipment, it is expedient to conduct polycondensation in a column-type apparatus having a packing, a homogeneous mass and alkali being continuously fed to the apparatus under stirring. To improve the process performance, polycondensation is conducted under stirring by applying hydrodynamic pulsations at a frequency of from 50 to 300 min$^{-1}$ and with an amplitude of from 5 to 40 mm, using epichlorohydrin and 2,2-bis(p-hydroxyphenyl)propane in a molar ratio of 1-1:2-1 respectively.

For diminishing the consumption of epichlorohydrin, it is preferable to use a 8-20% aqueous solution of alkali. Since epoxy resins with different molecular weights have different solubilities in organic solvents, it is of interest to consider the range of solvents for the given process.

As a solvent use should preferably be made of a ketone, an alcohol, such as butanol and isobutanol, or a mixture of an alcohol and an aromatic hydrocarbon, such as a mixture of butanol and toluene.

The process for preparing epoxy resin according to the invention is conducted in the following manner. The monomers epichlorohydrin and 2,2-bis(p-hydroxyphenyl) propane, a solvent, and an alkali in an amount of from 0.5 to 4% by weight of the epichlorohydrin are charged into reactor. A homogeneous mass is prepared under stirring of the resultant mixture at a temperature of from 45° to 70° C. Homogenization occurs owing to the reaction between epichlorohydrin and 2,2-bis(p-hydroxyphenyl)propane with the formation of chlorohydrin ether of 2,2-bis(p-hydroxyphenyl)propane.

A relatively small amount of the solvent is used, and secondary reactions are eliminated. Losses of epichlorohydrin are thus reduced.

The resultant homogeneous mass is stable, and the solid phase does not precipitate therefrom even upon cooling.

Subsequently an aqueous solution of an alkali in an amount varying from 45 to 50% by weight of the epichlorohydrin charged is added to the resultant homogeneous mass, and polycondensation process is conducted under stirring at a temperature of from 70° to 90° C. This process can be conducted in both batch and continuous reactors.

The continuous process is conducted in a column-type apparatus provided with a packing. The organic mass preliminarily homogenized as described above and an aqueous solution of an alkali are continuously fed to the reactor. The process is conducted under stirring by applying hydrodynamic pulsations at a frequency from 50 to 300 min with an amplitude varying from 5 to 40 mm. This enables the process to be conducted at a relatively low temperature thus permitting substantial savings of energy. The employment of packaged reaction equipment enables the reduction of working and unit capital investments.

The process according to the invention has the following advantages over the prior art:

1. Preliminary homogenization of the starting monomers in the presence of catalytic quantities of an alkali enables the obtaining of a highly concentrated homogeneous mass using small quantities of a solvent, a better utilization of the reaction zone, and reduction of epichlorohydrin losses.

2. The conduct of the continuous polycondensation process in a column-type equipment simplifies the processing technology, reduces power, working and unit capital investments.

Illustrative examples of the process acoording to the invention are given below.

EXAMPLE 1

A mixture consisting of 12.1 parts by weight of epichlorohydrin, 23.4 parts by weight of 2,2-bis(p-hydrophenyl)propane, 16.8 parts by weight of toluene, 8.4 parts by weight of n-butyl alcohol, and 20% aqueous solution of sodium hydroxide in an amount of 0.5% by weight of the epichlorohydrin was charged into a reactor, heated to 70° C. under stirring and allowed to stay at this temperature to obtain a homogeneous mass. Then a 20% aqueous solution of sodium hydroxide in an amount of 45% by weight of the epichlorohydrin was added to the resultant mass, and polycondensation was conducted at 80° C. until the end product is obtained.

After separation of the phases, neutralization of the organic phase and its purification to remove sodium chloride the solvent was distilled off.

The resultant epoxy resin has the following properties:

| | |
|---|---|
| epoxy (ethylene oxide) number | 4.8% |
| melting point (ring-and-ball method) | 88° C. |
| chlorine content | 0.08%. |

EXAMPLE 2

A mixture similar to that described in Example 1, except that sodium hydroxide was used in an amount of 4% by weight of epichlorohydrin, was allowed to stay in the reactor under stirring at a temperature of 45° C. to obtain a homogeneous mass. The polycondensation process was conducted as described in Example 1. The properties of the resultant epoxy resin were as described in Example 1.

EXAMPLE 3

A mixture similar to that described in Example 1, except that butyl alcohol was replaced by isobutyl alcohol, was allowed to stay in the reactor at 60° C. under stirring to obtain a homogeneous mass. The polycondensation process was conducted as described in Example 1 at 90° C.; the properties of the resultant epoxy resin were as described in Example 1.

EXAMPLE 4

A mixture prepared as described in Example 1, except that toluene and butyl alcohol were replaced by methylethyl ketone, was allowed to stay at 50° C. under stirring to prepare a homogeneous mass. Polycondensation was conducted as described in Example 1, at 70° C. The properties of the resultant epoxy resin were as described in Example 1.

EXAMPLE 5

A mixture consisting of 9.9 parts by weight of epichlorohydrin, 22.6 parts by weight of 2,2-bis(p-hydroxyphenyl)propane, 13.6 parts by weight of toluene, 6.8 parts by weight of n-butyl alcohol, and a 15% aqueous solution of sodium hydroxide in an amount of 2% by weight of epichlorohydrin was charged into a reactor, heated to 55° C. and allowed to stay under stirring to obtain a homogeneous mass. Subsequently sodium hydroxide of the same concentration in an amount of 50% by weight of epichlorohydrin was added to the resultant mass and the polycondensation was conducted at a temperature of 80° C. under stirring.

The resultant epoxy resin had the following properties:

| | |
|---|---|
| epoxy number | 1.4% |
| chlorine content | 0.15% |
| melting point (ring-and-ball method) | 115° C. |

EXAMPLE 6

A mixture consisting of 35.2 parts by weight of epichlorohydrin, 47.3 parts by weight of 2,2'-bis(p-hydroxyphenyl)propane, 20 parts by weight of toluene, 10 parts by weight of n-butyl alcohol, and a 8% aqueous solution of sodium hydroxide in an amount of 4% by weight of the epichlorohydrin was charged into a reactor and allowed to stay at a temperature of 55° C. under stirring to obtain a homogeneous mass. Subsequently sodium hydroxide was added to the resultant mass in the same concentration in an amount of 47% by weight of the epichlorohydrin and the polycondensation was conducted at a temperature of 75° C. under stirring to obtain the end product.

After the treatment described in Example 1 the resultant epoxy resin had the following properties:

| | |
|---|---|
| epoxy number | 14.8% |
| chlorine content | 0.15%. |

EXAMPLE 7

A homogeneous mass was prepared as described in Example 1, except that the solvent was acetone.

Polycondensation was conducted in a column-type reactor having a stationary packing under stirring by applying hydrodynamic pulsations at a frequency of 50 min$^{-1}$ and with an amplitude of 40 mm at a temperature of 90° C. The abovedescribed homoeneous mass was continuously fed to the reactor at a rate of 15.7 l/h, and a 10% aqueous solution of sodium hydroxide in an amount of 47% by weight of the epichlorohydrin was also fed to the reactor at a rate of 14.1 l/h. The resultant epoxy resin had the properties as described in Example 1. The yield of the resin per unit volume of reaction mass was 27.2% by weight.

EXAMPLE 8

A homogeneous mass was prepared as described in Example 4, except that the solvent was methylisobutylketone.

Polycondensation was conducted as described in Example 7, at a frequency of 300 min$^{-1}$ and with an amplitude of 5 mm. 15% aqueous solution of sodium hydroxide was fed in an amount of 45% by weight of the epichlorohydrin. The properties of the resultant epoxy resin were as described in Example 1. The yield of the resin per unit volume of the reaction mass was 29% by weight.

What we claim is:

1. A process for preparing epoxy resin, comprising allowing a mixture of epichlorohydrin, 2,2-bis(p-hydroxyphenyl) propane and a solvent in the presence of an alkali used in an amount of from 0.5 to 4% by weight of the epichlorohydrin, to stay at a temperature of from 45° to 70° C. to obtain a homogeneous mass with subsequent adding to the resultant mass of an alkali used in an amount of from 45 to 50% by weight of the epichlorohydrin and conducting polycondensation at a temperature of from 70° to 90° under stirring to obtain the end product.

2. A process as claimed in claim 1, wherein the polycondensation is conducted in a column-type apparatus having a packing with continuous feeding thereto of the homogeneous mass and an alkali under stirring.

3. A process as claimed in claim 2, wherein the stirring is effected by applying hydrodynamic pulsations at a frequency of from 50 to 300 min$^{-1}$ and with an amplitude of from 5 to 40 mm.

4. A process as claimed in claims 1 through 3, wherein epichlorohydrin and 2,2-bis(p-hydroxyphenyl) propane are used in a molar ratio of 1-1:2-1, respectively.

5. A process as claimed in claim 1, wherein use is made of a 8 to 20% aqueous solution of an alkali.

6. A process as claimed in claim 1, wherein the solvent comprises a ketone, an alcohol, or a mixture of an alcohol and an aromatic hydrocarbon.

* * * * *